No. 12,735. REISSUED DEC. 24, 1907.

P. HALLOT.

RAILWAY BRAKE.

APPLICATION FILED AUG. 25, 1904.

3 SHEETS—SHEET 1.

Witnesses:
C. P. Kesler

Inventor
Paul Hallot
By
James L. Norris
Atty.

THE NORRIS PETERS CO., WASHINGTON, D. C

No. 12,735. REISSUED DEC. 24, 1907.
P. HALLOT.
RAILWAY BRAKE.
APPLICATION FILED AUG. 25, 1904.
3 SHEETS—SHEET 2.
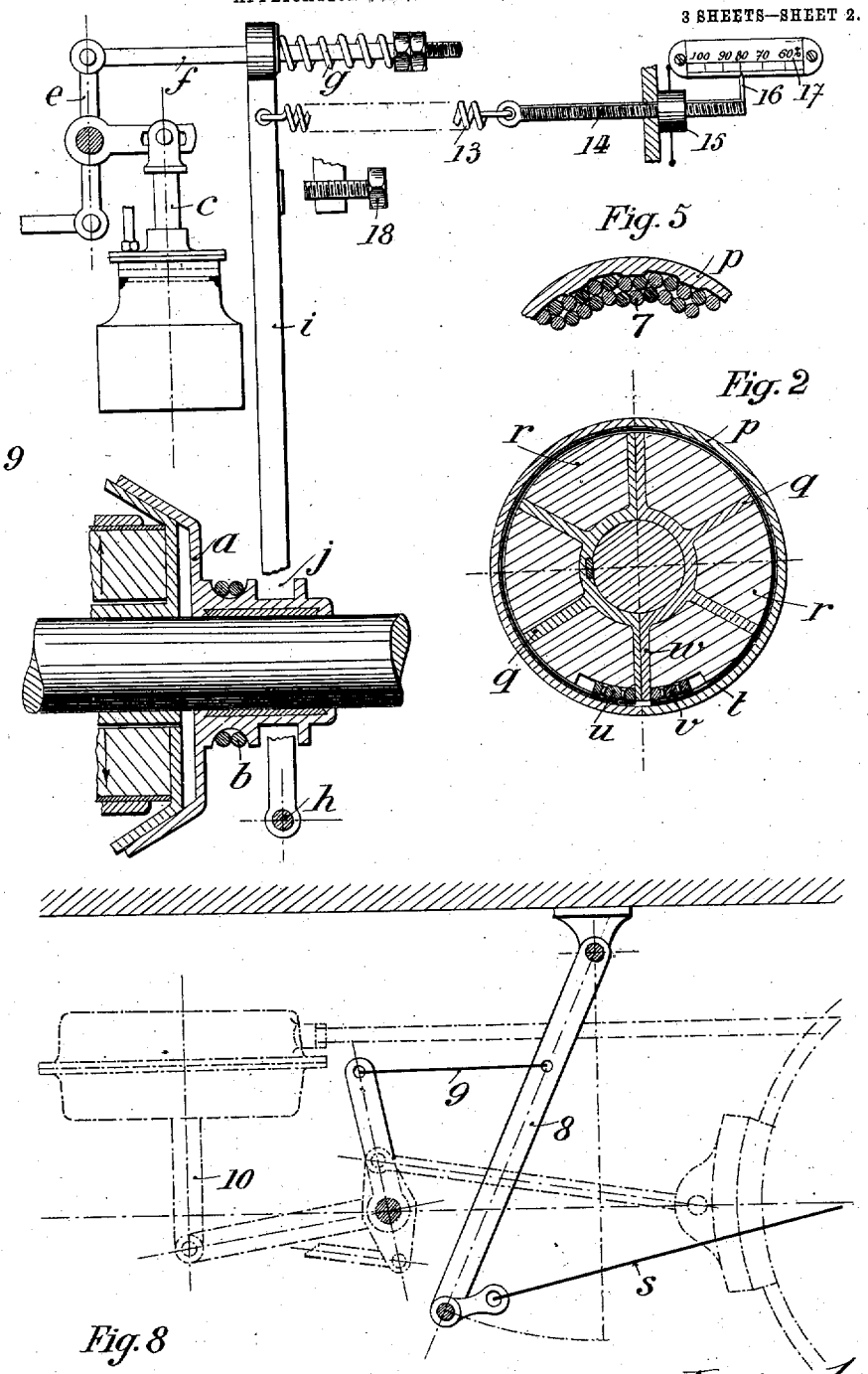
Witnesses:
James L. Norris, Jr.
C. J. Kesler
Inventor
Paul Hallot
By James L. Norris
Atty.
THE NORRIS PETERS CO., WASHINGTON, D. C.

No. 12,735. REISSUED DEC. 24, 1907.

P. HALLOT.

RAILWAY BRAKE.

APPLICATION FILED AUG. 25, 1904.

3 SHEETS—SHEET 3.

Witnesses:
James L. Norris, Jr.
C. D. Kesler,

Inventor
Paul Hallot
By James L. Norris
Atty

THE NORRIS PETERS CO., WASHINGTON, D. C.

UNITED STATES PATENT OFFICE.

PAUL HALLOT, OF VINCENNES, FRANCE.

RAILWAY-BRAKE.

No. 12,735. Specification of Reissued Letters Patent. Reissued Dec. 24, 1907.

Original No. 730,115, dated June 2, 1903, Serial No. 130,198. Application for reissue filed August 25, 1904. Serial No. 222,073.

*To all whom it may concern:*

Be it known that I, PAUL HALLOT, a citizen of France, residing at Vincennes, France, having invented certain new and useful Improvements in Railway-Brakes, of which the following is a specification.

This invention relates to certain improvements in the brakes described in the specifications of my prior patents; and it has for its object to simplify the construction thereof in such a manner as to render them applicable to brakes of all other systems without having to alter the arrangement of such other systems.

In order that the invention may be readily understood, I will describe the same fully with reference to the annexed drawings, in which—

Figure 1:
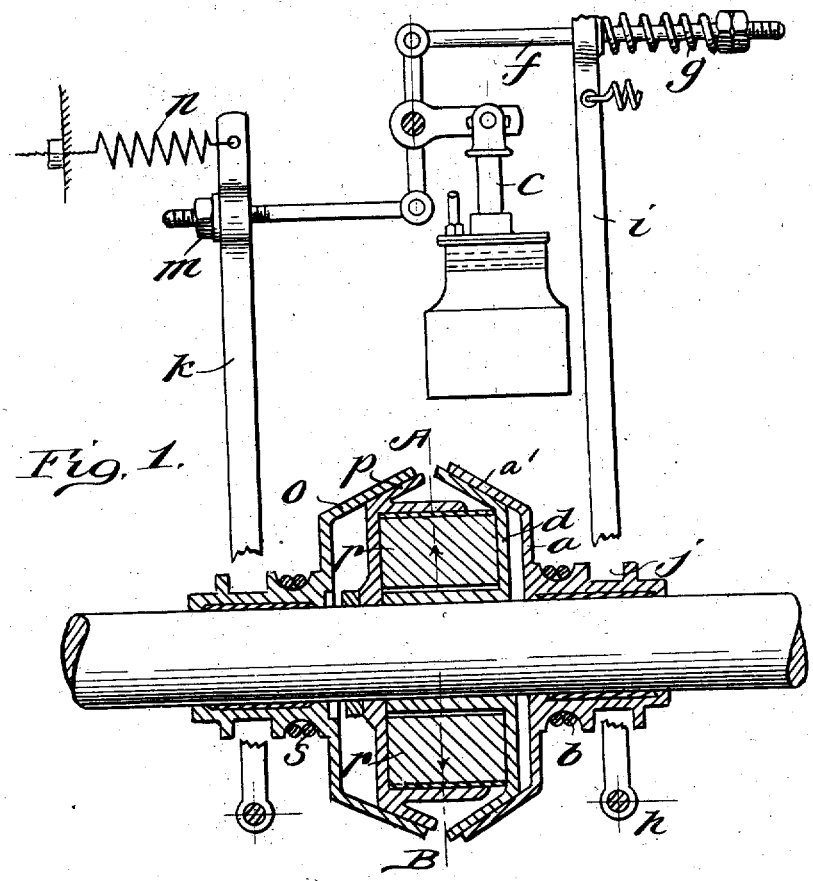
Figure 4:
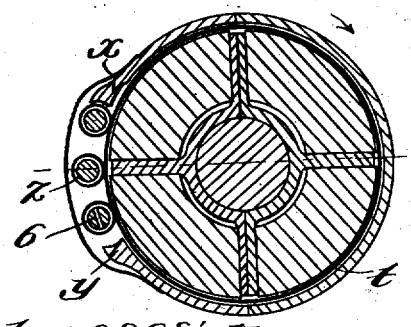
Figure 3:
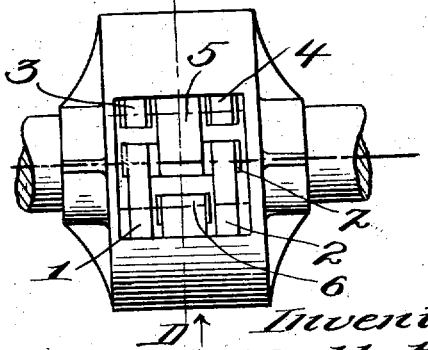
Figure 6:
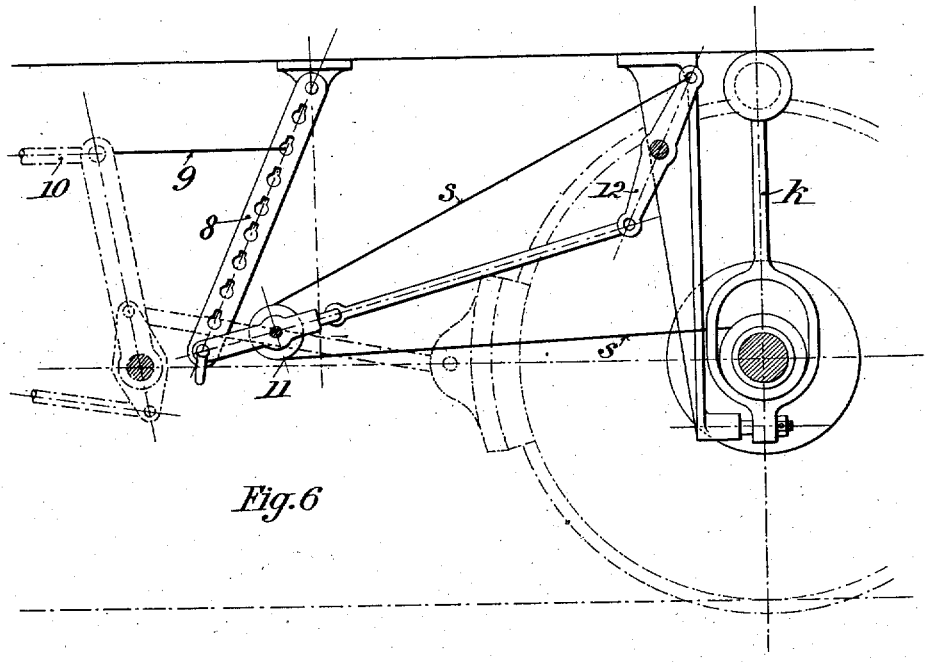
Figure 7:
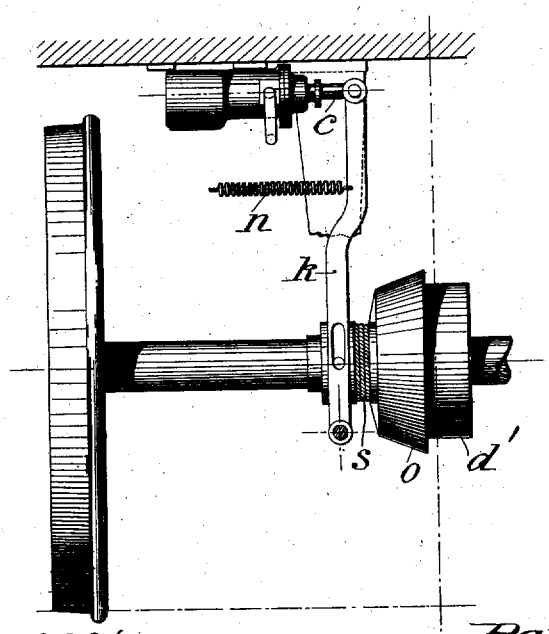

Figure 1 is a transverse section of the simplified arrangement of brake combined with the centrifugal governor or regulator shown in section, taken on the axial line of the wheel-axle. Fig. 2 is a section of the said governor, taken on the line A B of Fig. 1. Fig. 3 is an elevation of a modified form of this governor. Fig. 4 is a section of the same, taken on the line C D of Fig. 3. Fig. 5 shows a further modification. Figs. 6 and 7 show various manners of applying the automatic governor to compressed air-brakes of all kinds. Fig. 8 shows the application of the said governor to vacuum-brakes, and Fig. 9 illustrates means for adjusting or varying the power of the brake.

In my prior construction as shown in Letters Patent of the Republic of France Number 306,115, dated April 28, 1902, and of the Empire of Germany Number 148,313, dated May 3, 1902, the brake is actuated by means of a drum carried upon one of the axles of the vehicle and over which passes a cable connected to the brake-gear. The said drum receives motion from a piston *c*, worked either by compressed air or by vacuum, or otherwise. At the moment of braking a centrifugal apparatus is brought into action and so increases the pressure of the brake-blocks for a determinate amount and which automatically disappears as soon as the rotation of the wheel tends to stop.

The present invention has for its object to introduce certain improvements into brakes of this kind. The roller or pulley of the drum is now replaced by a bevel-pulley *a* having a coned rim *a′* carried by the axle and adapted to be moved longitudinally thereon, so as to be brought into contact with a clutch cone *d*, keyed on the axle or any shaft connected therewith and with which the cone rim of the drum *a* is adapted to have frictional engagement. The rod *c* of the controlling-piston is connected by a bell-crank lever *e* to a rod *f*, which through the medium of the spring *g* causes the lever *i* (engaging in a groove *j* in the drum *a*) to move upon the axis *h*. This movement places the cone rim *a′* of the drum *a* in frictional engagement with the cone clutch *d*, and effects an initial braking action of relatively light character avoiding the sudden objectionable jerk or jar which would occur on a very forceful initial application of brake. If the engineman wishes to have a more powerful braking action applied, the multiplying apparatus is brought into action by the engineman effecting a further lowering pressure above the piston *c*. The increase in the upward stroke of the said piston compresses the intermediate spring *g* and pulls the operating lever *k* over to the right by means of the lock-nut *m*, notwithstanding the opposition of the spring *n*.

As shown in Fig. 1, the initial motion of the governor is no longer derived from the wheel-tire, but from the axle, so as to obtain a reduced rotary speed and consequently less wear of the frictional surfaces, although the principle of the automatic working remains the same. In this instance the power is obtained by bringing the cone rim of the pulley *o* into contact with an intermediate coned pulley *p*, which constitutes a regulator and which is carried by the axle and caused to rotate therewith by means of centrifugally acting elements. To this end the friction-cone *d* (keyed on the axle) is cast with a series of partitions *q*, (see Fig. 2,) so as to form compartments in which are loosely placed metal masses *r* of, say, iron or lead. The intermediate pulley *p* is turned on its inner periphery, so as to allow it to fit with a certain amount of play over all these masses. When at work, the said masses *r* by the action of centrifugal force press against the internal periphery of the pulley *p*, and thus cause the latter to be positively rotated therewith. If, therefore, the pulley *o*, on which is wound the cable *s*, whose action is added to that of the cable *b*, be brought into contact with the pulley *p* while the axle is revolving, the said pulley *o* will be driven; but as soon as the speed of rotation of the masses *r* lessens sufficiently, the force with which may engage the pulley *p*, decreases, and the pulleys *o* and *p* rotate together as a unit with decreased speed, and since the rope *s*, which actuates the brakes, is operated by the pulley *o*, there will be a decrease of the force of the braking action, which would cause a "skidding pressure" and automatically regulating such pressure. This system of regulation offers the following advantages over the previous ones: (*a*,) very slight friction between the rubbing-surfaces, (about one hundred and fifty grams per square centimeter;) (*b*) very regular working at all speeds; (*c*,) no necessity for lubrication; (*d*,) very great power with reduced bulk. The practical effectiveness of the apparatus may be increased in a very appreciable ratio, while avoiding wear of the metal masses. To this end a steel band *t*, Fig. 2, in the form of a ribbon may be interposed between the masses *r* and the inner periphery of the intermediate pulley *p*. The circumferential development of this steel band is less than that of the pulley, and the two ends of the said band are riveted to two steel driving-blocks *u v*, capable of being readily displaced in two corresponding recesses cast in two adjacent masses *r*. Whatever may be the direction of rotation of the masses, one of the blocks—for example, *u*—will be arrested by the common partition *w*, the other extremity tending, on the contrary, to recede therefrom, in proportion to the centrifugal force exerted by the masses *r*. Figs. 3 and 4 show a more powerful arrangement, which is obtained by giving two turns to the band *t* and by causing it to act directly on the pulley *p*. To this end the said pulley is formed with two abutments or stops *x y*, cast thereon. The band *t* is composed of two lateral ribbons 1 and 2, terminating in axes 3 and 4, adapted to bear against the abutment or stop *x* when rotation takes place in the direction of the arrow. These two ribbons are coupled by a common axis *z* to an intermediate ribbon 5, which terminates at its other end in an axis 6. The masses when revolving tend to carry the ribbon with them, and said ribbon, through its axes 3 and 4, drives the pulley *p* with a force equal to the centrifugal throw of the masses *r*. Fig. 5 shows a detailed arrangement wherein the interior periphery of the intermediate pulley *p*, is provided either with grooves or with slightly-projecting ribs designed to facilitate the driving of this pulley by centrifugal force. According to this particular arrangement iron balls 7 are loosely arranged in superposed layers above the masses *r*. It will be understood that the various arrangements of the improved governor of my present invention herein set forth will not require any modification of the working devices or elements of my previous specifications herein referred to, as the same are adapted for service to increase and regulate the pressure of brakes of all systems of which I am aware. The force transmitted by the cable *s* on the drum *o* may be utilized in very different ways without departing from the principle of the present invention. In particular the special action of this governor may be utilized to double the power of all compressed-air brakes and to render such brake action proportional to the load on the axles without introducing any modification into existing brakes. To this end the friction-cone *d*, Fig. 1, keyed on the axle, is reduced to a simple box *d'*, Fig. 7. The cable *s* directly actuates a suitably-arranged reinforcing rod 8, Fig. 8, connected with the existing brake-gear by a connecting-band, such as 9.

10 represents the piston-rod of the usual brake-cylinder.

For goods-trucks of heavy tonnage the arrangement shown in Fig. 6 will be found very advantageous. The cable *s* passes over a pulley 11 and its free end is secured to one end of a rocking lever 12, pivoting about its center, and the other end of which is coupled to the axis of the pulley 11. The connecting-band 9 is connected to the rod 8 by any suitable means. Coupling-holes provided in the rod 8, with any of which the band 9 may be connected, permit the constant force of the cable *s* to produce on the connecting-band 9, and hence on the brake-gear, a variable force, according to the load carried by the vehicle, so that the braking force is in constant ratio with the load on the axles. If it be desired to diminish the tension of the cable *s*, it is only necessary to provide a tackle. Fig. 8 shows the same arrangement applied to an ordinary passenger-coach provided with a vacuum-brake. As the load is appreciably constant and by no means high, (five or six, French tons,) the cable *s* is directly attached to the end of the connecting-rod 8, and the connecting-band 9 is permanently connected to this rod.

Fig. 9 shows an additional arrangement whereby the power of any brake can be strictly regulated whenever an excess of force can be economically availed of. For this purpose the spring 13, which serves to draw the connecting-rod *i* backward, is such as to set up a determined resistance (for instance, twenty-five per cent. of the weight-brakes) in addition to the force necessary to insure the disengagement of the cone *a*. This regulating-spring is secured to a screw-rod 14, adapted to advance without turning when the adjusting-nut 15 is operated. The end of this screw-rod carries an index 16, which is placed opposite the division 80 of a graduated plate 17, suitably fixed to the under carriage of the coach after the brake has been regulated. During the testing of the brakes this force of eighty per cent. of the weight braked is preferably obtained by suitably adjusting the stop-screw 18, the effect of which is to vary the initial position of the piston *c* in the cylinder, and hence the value of the expansion. The brakes having been thus adjusted, it is sufficient, if it be subsequently desired to alter their power for use with another system, to suitably operate the nut 15 to bring the index 16 opposite the division representing the desired force.

It will be obvious that the friction-cone described in this specification instead of being mounted on the car-axle may be arranged on any shaft rotated by the car-axle or by the movement of the car, and therefore when in the following claims I refer to the "car-axle" I desire said term to also include a shaft operated by the car-axle or by the movement of the car.

Having thus described my invention, what I claim is:—

1. In a brake for vehicles, a series of revolving centrifugal masses, corelated mechanism arranged to transmit the energy of said masses to the brake, a regulating device interposed between said masses and mechanism, and means for applying the brake to control the rotation of the wheels.

2. In a vehicle brake, the combination with a revolving part of the vehicle, of a drum arranged thereon, a cord connected with said drum and with brake mechanism, a clutch mounted to rotate with the revolving part, a piston under the control of the operator, and connections between said piston and drum, whereby the latter is made to engage and disengage with said clutch, substantially as described.

3. In combination with brake mechanism, a brake regulating device consisting of a pulley loosely arranged on the axle, means for bringing the same into operation, and revolving centrifugal masses longitudinally immovable with respect to the axle and arranged to engage said regulating device with a force that automatically increases and decreases in proportion to the speed of rotation of the centrifugal masses.

4. In a brake mechanism, the conbination with centrifugally acting revolving masses, means actuated by the live force of the car and surrounding said masses to create additional brake power proportionately to the speed of the car, and an intermediate regulating device whereby the braking power or action decreases automatically in proportion to the reduction of the rotary speed of the revolving masses.

5. In a brake, the combination with a rotary part and centrifugally acting revolving masses within said part, means for operating the brake, and a regulating element interposed between the revolving masses and the brake operating means.

6. In a brake mechanism, the combination with a car axle, of an element connected with and partaking of the rotation of said axle, centrifugally acting masses arranged in said element, an intermediate pulley arranged to be engaged by said revolving masses, a cone pulley shiftable into and out of engagement with said intermediate pulley, and means for shifting said cone pulley.

7. In a brake mechanism, the combination with a car axle, a series of centrifugally acting revolving masses arranged to rotate with said axle, an intermediate pulley arranged to be engaged by said revolving masses, a steel plate or ribbon interposed between the revolving masses and the intermediate pulley and having stops *x* and *y* to increase the effective power of the revolving masses to rotate the intermediate pulley, a cone pulley adapted to be shifted into and out of engagement with said intermediate pulley and means for shifting said cone pulley.

8. In a brake mechanism, the combination with a car axle, an element rotating with said axle, means shiftable upon the axle to engage said element and adapted to exert a slight braking action, a supplemental brake operating means adapted to exert increased braking power and regulating means loosely carried by the axle and adapted to modify the action of the supplemental brake-operating devices automatically in proportion to the rotary speed of the axle of the car.

9. In a brake mechanism, the combination with a car axle, of an element arranged to rotate therewith, a series of centrifugally acting masses arranged in said element, a regulating device consisting of an intermediate pulley arranged to be engaged and rotated by said masses, primary brake operating device and supplemental brake operating devices, and means operating at the will of the driver to bring said brake operating devices into action.

10. In a brake mechanism, the combination with means for applying the brake, of regulating means comprising the screw 18, spring 13, screw 14, nut 15, and indicating finger 16 secured to the screw 14, substanstantially as described.

11. The combination with a car-axle, of a series of compartments arranged around said axle, each of said compartments containing a mass adapted to be displaced by centrifugal force, a pulley surrounding said compartments and adapted to be engaged by said masses, and means for operating the car brakes by the movement of said pulley.

12. The combination with a car-axle, of a series of compartments arranged around said axle, each containing a mass adapted to be displaced by centrifugal force, a pulley surrounding said compartments and adapted to be engaged by said masses, the outer surface of said pulley being coned, a cone-pulley mounted on said car-axle, means for operating the car-brakes by the movement of said cone-pulley and means for throwing said cone-pulley into engagement with the coned outer surface of said first mentioned pulley.

13. The combination with a car-axle, a cone-pulley mounted on said car-axle and rotating therewith, a second cone-pulley loosely mounted on said car-axle, means for operating the car-brakes by the movement of said second cone-pulley, a series of compartments arranged around said car-axle, each containing a mass adapted to be displaced by centrifugal force, a pulley surrounding said compartments, the outer surface of said pulley being coned, a third cone-pulley mounted on said car-axle, means for operating the car-brakes by the movement of said third cone-pulley and means for simultaneously throwing said second cone-pulley into engagement with said first-mentioned cone-pulley and said third cone-pulley into engagement with the coned outer surface of the pulley which surrounds said compartments.

14. The combination with a car-axle, of a cone-pulley mounted thereon and rotating therewith, a second cone-pulley loosely mounted on said shaft, said second cone-pulley having a contracted sieeve portion, means for operating the car-brakes by the movement of said second cone-pulley, a plurality of compartments arranged around said car-axle, each containing a mass adapted to be displaced by centrifugal force, a pulley surrounding said compartments adapted to be engaged by said masses, the outer surface of said pulley being coned, a third cone-pulley loosely mounted on said car-axle, said third cone-pulley having a contracted sleeve portion, means for operating the car-brakes by the movement of said third cone-pulley, a forked lever engaging the contracted sleeve portion of said second cone-pulley, a second forked lever engaging the contracted sleeve portion of said third cone-pulley, a piston controlled by the engineer, and means operated by said piston for actuating said first and second levers to throw said second cone-pulley into engagement with said first-mentioned cone-pulley and said third cone-pulley into engagement with the outer coned surface of the pulley which surrounds said compartments.

15. The combination with an axle, of a normally non-rotative brake actuating member, a locking element normally out of engagement therewith, and means controlled by the speed of rotation of the axle to operate directly on the locking element for moving the same into and out of engagement with the actuating member.

16. The combination with an axle, of a normally non-rotative brake actuating member, a locking device normally out of engagement therewith, and centrifugally controlled weights operative directly on the locking element for moving the same into and out of engagement with the actuating member.

17. The combination with an axle, of a normally non-rotative brake actuating member, a locking element normally out of engagement therewith, and means controlled by the speed of rotation of the axle to move the locking element into and out of engagement with the actuating member.

18. The combination with an axle, of a normally non-rotative brake actuating member, a locking device normally out of engagement therewith, and centrifugally controlled weights for moving the locking element into and out of engagement with the actuating member.

19. The combination with an axle, of a pulley loosely mounted thereon and having a cone-shaped band, a shoe rigid with the axle and disposed within the band, and means for moving the pulley into engagement with the shoe.

20. The combination with an axle, of a cone-shaped pulley loosely mounted thereon, brake mechanism, connections between the pulley and the brake mechanism, a fluid cylinder, a connection between the fluid cylinder and the pulley to move the latter upon the axle, and a shoe fixed with relation to the axle and adapted to engage the pulley to lock the latter against rotation.

21. In a brake mechanism, a frictional member freely movable on the axle of the vehicle, a fixed member having centrifugally acting masses for engagement with the frictional member, and a fluid controlled device for actuating said member to bring the same into engagement with the fixed member.

22. In a brake mechanism, a fluid controlling device for the same, a fixed centrifugally acting brake member, operated automatically according to the increase or decrease of speed of rotation of the axle for correspondingly increasing and decreasing the frictional pressure thereof, a loosely arranged frictional engaging device actuated by the fluid controlling device for bringing the same into operation, and means independent of the fluid device for adjusting the braking mechanism to tension the same according to the variable load on the vehicle.

23. In a brake, a centrifugally acting frictional element fixed to the axle of the vehicle, a freely movable locking element normally out of engagement therewith, and a fluid controlling device for actuating the locking element to bring the same into engagement with said fixed element.

Signed at Paris, France, the 16th day of May, 1904.

PAUL HALLOT.

Witnesses:
ALFRED FREY,
HANSON C. COXE.